US009110442B1

(12) United States Patent  
Raiford

(10) Patent No.: US 9,110,442 B1  
(45) Date of Patent: Aug. 18, 2015

(54) INFORMATION ARTICLE HAVING POPULATED AND LASER ABLATED INDICIA IN REGISTRATION

(71) Applicant: Frank D. Raiford, Chesapeake, VA (US)

(72) Inventor: Frank D. Raiford, Chesapeake, VA (US)

( * ) Notice: Subject to any disclaimer, the term of this patent is extended or adjusted under 35 U.S.C. 154(b) by 215 days.

(21) Appl. No.: 13/838,204

(22) Filed: Mar. 15, 2013

(51) Int. Cl.
*G03H 1/00* (2006.01)
*G02B 5/18* (2006.01)

(52) U.S. Cl.
CPC .................................. *G03H 1/0011* (2013.01)

(58) Field of Classification Search
None
See application file for complete search history.

(56) References Cited

U.S. PATENT DOCUMENTS

| 5,703,703 A | 12/1997 | Yamate |
| 7,835,047 B1 | 11/2010 | Raiford |
| 2003/0058491 A1 | 3/2003 | Holmes |

*Primary Examiner* — Jade R Chwasz
(74) *Attorney, Agent, or Firm* — Shaddock Law Group, PC

(57) ABSTRACT

An information article that includes a holographic film layer having at least some complementary or representative indicia formed in the holographic film layer, a first high-opacity blocking layer having at least one aperture formed by a void in the first high-opacity blocking layer, a second high-opacity blocking layer having at least one aperture formed by a void in the second high-opacity blocking layer, a first substantially clear laminate layer, wherein a primary indicia is populated on a top side of the clear laminate layer, wherein the primary indicia corresponds to or is represented by the complementary or representative indicia, wherein the complementary or representative indicia is laser ablated within the structure of the information article, and wherein the primary indicia is in close, tight, exact, or proximate registration with the complementary or representative indicia.

20 Claims, 8 Drawing Sheets

INFORMATION ARTICLE HAVING POPULATED AND LASER ABLATED INDICIA IN REGISTRATION

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE INVENTION

1. Field of the Invention

The present disclosure relates generally to a multi-layered information article incorporating the LaserLoc technology of the present invention (a LaserLoc information article). More specifically, the present invention relates to a process for incorporating one or more variable or fixed types of ablated information within a multi-layered LaserLoc information article and a LaserLoc information article product.

2. Description of Related Art

It is important to be able to authenticate originally issued documents and to readily distinguish authentic documents from counterfeit documents. It is generally known to use various specialty papers, color change inks, or micro-printing in the creation of certain authentic documents.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE INVENTION

However, while possibly difficult to duplicate, these specialty papers, color change inks, and micro-printing techniques can be replicated by others.

Additionally, using these techniques for mass production documents, such as, for example, licenses or identification cards, can be cost prohibitive.

The present invention relates generally to a process for incorporating one or more variable or fixed types of ablated information within a multi-layered LaserLoc information article and a LaserLoc information article product produced by that process.

A unique LaserLoc information article is created by combining variable and/or fixed data or other design elements into the design structure of the LaserLoc information article. This process allows for the viewing of this information, which has been incorporated within the LaserLoc information article from the front and back of the structure using available, ambient light or light within a determined light spectrum. The information on the front of the structure is readily visible with the naked eye and the information is also visible on the back of the structure when it is viewed with an appropriate light source being transmitted from the front of the structure toward the back of the structure.

This structure can incorporate limitless apertures allowing for varying sizes and shapes that will define the visual appearance of the structure, and the information article can be populated using numerous printing and imaging technologies and techniques.

Some of the exemplary technologies used to populate the information article are: dye sublimation, resin, pigment transfer, inkjet, toner based printing, offset lithography, gravure printing, intaglio printing, silkscreen printing, laser etching, laser printing, acid relief demetalization, and/or any other current or later developed technology capable of populating the information article.

The purpose of the design is to create a unique LaserLoc information article that can incorporate at least some primary indicia and some complementary or representative indicia, such as, for example, an image, photograph, personal information, and/or other fixed or variable data or other design or mechanical elements, within the structure, which allows for viewing and/or reading of the LaserLoc information article from both the front and back of the structure. This process is unique and will provide for the strong visual and mechanical validation of any article or document requiring security elements.

In addition to the strong visual validation features offered by the LaserLoc information article, numerous other security elements may optionally be combined with the LaserLoc technology to create additional overt and covert security values.

In various, non-limiting embodiments, one or more light excitable core laminates (i.e., laminate layers excitable by exposure to black light, ultraviolet (UV) light, infrared (IR) light, UV invisible long wave light, UV invisible short wave light, laser light, etc., and the like) may be combined with the LaserLoc technology. A light excitable core laminate, when coupled with the LaserLoc technology, eliminates the color shifting characteristics of the personalized and fixed data within the structure when illuminated with an appropriate wavelength of light. The light excitable core laminate also allows the viewing of any of the data that has been laser ablated into the LaserLoc information article on the reverse side of the structure based on the color of the light excitable core laminate.

In various, non-limiting embodiments, certain data or design elements may be laser ablated into the LaserLoc information article. Laser ablating into the LaserLoc information article allows for fixed and or variable indicia, such as, for example, data, images, photographs, logos, or other design elements to be irreversibly and unalterably coupled within the structure and allows for a see thru view of the information from front to back and/or back to front within the LaserLoc information article. This process is counterfeit resistant and allows for visual validation without the aid of any equipment.

The only requirement for validation of this feature is some type of light source (sun, moon, artificial light, etc.) and a person with the ability to see. This process also allows for machine validation of data or design elements. The data can be read using various current technologies, which could include bar codes, or any other technology that relies on light and/or energy to create an interpretable pattern.

In various, non-limiting embodiments, metal detection capabilities can be incorporated into the LaserLoc information article. Metal detection capabilities of the LaserLoc information article allow for additional covert security functionality. In these exemplary embodiments, the LaserLoc information article is composed partly of a ferrous (or other appropriately detectable) material in a quantity great enough to activate, for example, a hand held metal detector commonly used by Law Enforcement and Homeland Security Officers and yet not enough ferrous material to activate a walk through metal detection system commonly used at airports or at other secure building. This feature, if incorporated, will allow for the validation of the LaserLoc information article at airports, courthouses, and all public and private locations where document validation is required.

In various, non-limiting embodiments, certain color shifting and movement characteristics of the LaserLoc technology are incorporated into the front of the information article side causing the indicia and/or fixed data or other design elements to color shift and/or move during side-to-side rotation of the article. In these exemplary embodiments, the color shifting or movement characteristics of the LaserLoc information article are not evident when viewing the back side of the information article when it is exposed to a light source from the front side of the structure. This feature allows for additional validation of the security devise and can be validated with minimal training or equipment.

In various, non-limiting embodiments, certain active and/or passive data storage devices or elements can be incorporated into the LaserLoc information article. The LaserLoc platform can allow for the viewing and reading of these storage devices from the front and reverse side of these informational devices. This functionality will allow the data storage element/device to appear to float inside the LaserLoc information article or appear to be encapsulated within the LaserLoc information article. Some of the data storage devises that may optionally be combined and/or incorporated within the LaserLoc information article are computer chips, bar codes, micro fiche, micro and nano-text symbols, magnetic stripe, wire antenna that are either passive or active, magnetic thread, x-ray reflective inks and fibers, metallic fibers, ultraviolet black light reflective inks and materials, infra-red reflective inks, laser reactive materials, symbols of various sizes, and/or any other current or later developed technology capable of storing data in or on the information article.

In various, non-limiting embodiments, biometric information can be incorporated into the LaserLoc information article. In these exemplary embodiments, the biometric information can be viewed and read from one or both sides of the structure and provide for the securing of data such as DNA structures, retinal information, finger and hand print information, facial recognition, vein recognition to name a few.

In various, non-limiting embodiments, thermocromatic (heat sensitive) inks and materials may be used in the LaserLoc information article. When heat sensitive inks or materials are used in the LaserLoc information article, a unique security zone can be created, which allows for the revealing of data that may be concealed within the LaserLoc information article with the aid of a heat source. The source of heat could come, for example, from friction such as a person's finger rubbing rapidly over the security zone, a flashlight, light bulb, or other mechanical or non-mechanical devise or element that would emit heat sufficient to activate the thermocromatic feature of the ink. The thermocromatic ink can be applied on top of or above all or part of the LaserLoc information article. The combination of these technologies creates a new security device that can be used to validate and view the information article.

In various, non-limiting embodiments, color shifting inks can be incorporated within the LaserLoc information article. When color shifting inks are incorporated within the LaserLoc information article, the color shifting ink can be viewed from the side of the LaserLoc information article with all of the color shifting characteristics of the specified color shifting ink. However, the opposite side of the LaserLoc information article will only reveal the primary color of the color shifting ink with none of the color shifting characteristics that are evident on the side of the LaserLoc information article with the color shifting ink. The combination of color shifting ink within the LaserLoc information article creates a new method and process for the validation of the color shifting ink by creating this unique validation test for this security feature.

Thus, the LaserLoc information article of the present invention combines LaserLoc functionality, various printing and imaging techniques, and active laser imaging onto a holographic film layer that is viewable through at least one aperture.

In various exemplary, nonlimiting embodiments, the LaserLoc information article utilizes a linkage of various and nonlimiting combinations of primary indicia and complementary or representative indicia, such as, for example, images, symbols, photographs, patterns, graphics, numbers, letters, alphanumeric characters, and the like, both visible and/or invisible, when printed, imaged, transferred, or otherwise revealed onto the structure of the LaserLoc information article. The primary indicia and complementary or representative indicia may appear in close, tight, and/or exact registration or maybe in proximate registration with one another (i.e., located anywhere on the structure of the LaserLoc information article) with the same or similar information applied using focused laser energy capable of penetrating or imaging on or through one or more metalized or other high-opacity blocking layers of the structure.

In certain exemplary, nonlimiting embodiments, primary indicia (such as visible and/or invisible identifying photographs) are printed, imaged, applied, transferred, or otherwise revealed thru various current or future technologies onto the LaserLoc information article. Using focused laser energy capable of rendering complementary or representative indicia of the same or similar photographic structures that correspond to or is represented by the primary indicia in not limited renderings either in registration to the primary indicia or not registered to the primary indicia on either a different or same plane of construction in the LaserLoc information article create an irreversible link or lock between that which was printed and that which has been imaged through laser ablation.

For example, upon viewing a color identifying photograph in the LaserLoc panel from the front of the LaserLoc information article, when the LaserLoc panel is in precise registration to the color identifying photograph, the color identifying photograph takes on the holographic value built into the structure of the LaserLoc information article. The reverse (back) side of the structure appears as a black and white and/or grey scale image with the holographic value built into LaserLoc panel. The unique complementary or representative indicia feature is only revealed when the structure of the LaserLoc information article is illuminated by a light source from either the back to the front or front to the back of the structure and at such time the photo is immediately transformed.

The color identifying photograph on the front changes from a color image to a black and white variant of the color identifying photograph based on the intensity and various setting of the laser based on the data at the instance of illumination of a light source from the back to front of the structure. The black and white/grey scale complementary or representative indicia on the back side of the structure of the LaserLoc information article changes to a negative image of the photo representing the unique data set and again the variation of the effects are based on the intensity of the data imaged by the laser based on various imaging parameters.

The linkage of various nonlimiting combinations of a wide range of security inks, resigns, films and the like such as ultraviolet (UV), infrared (IR), magnetic, UV invisible long wave, UV invisible short wave, dual band, laser invisible, color shifting, thermochromic, photochromic, chemical reactive, metallic ink, taggants, resigns, pigments and the like for intaglio, silkscreen, rotogravure, flexographic, letterpress, offset, transfer, or other printing or imaging methods are within the scope of the new functionality of the LaserLoc information article. Linking a printed and a laser ablated image on a structure of the LaserLoc information article to an invisible image in close, tight, or exact registration or in proximate registration (located anywhere on the structure of the LaserLoc information article) with the same or similar indicia applied using focused laser energy capable of penetrating or imaging on or through the metalized or other blocking layers of the structure of the LaserLoc information article creates a new unique security feature. For example when light, heat, chemical or other excitable (black light, infrared, etc.) invisible or visible images are linked in direct registration on a structure of the LaserLoc information article a new and unique security feature is created.

This new security feature allows for multiple visual effects utilizing the transmission of light both visible and invisible in of all of its spectrums and combinations allowing the unique color of the activated invisible ink to be seen on the reverse side of the structure once the metalized foil is perforated/ablated even if it traverses thru an alternate invisible ink or element on the opposite side of the structure. This multidimensional irreversible linkage between the invisible and visible on various layers inside the structure of the LaserLoc information article provides strong anti-counterfeit functionality.

When the features of the present invention are incorporated into a credit card type structure, the methods and structures of this invention allow for linkage of personal information such as photographs, fixed and/or variable data, or other design elements in a manner that is unalterable without detection and is resistant to imitation and duplication. This linkage of data and other design elements in an information article is critical to establishing a security feature that is easy to identify but difficult replicate.

When the LaserLoc technology is incorporated into a structure similar to paper, the methods and structures of this invention allow for a new medium to print security breeder documents such as birth certificates, passports, photo IDs, drivers licenses, permits, stock certificates, titles of registration, labels for brand goods protection, social security cards, checks, and currency to name a few that will provide visual validation of information that is unalterable and difficult to replicate.

Accordingly, this invention provides an information article of improved design.

This invention separately provides an information article with added visual security.

This invention separately provides an information article with security features that are easy to identify but difficult replicate.

This invention separately provides an added level of visual security to currency, passports, credit cards, information articles, brand goods protection, breeder documents, and other applications.

These and other features and advantages of the presently disclosed invention are described in or are apparent from the following detailed description of the exemplary, non-limiting embodiments.

BRIEF DESCRIPTION OF THE SEVERAL VIEWS OF THE DRAWINGS

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a basis for the claims and as a representative basis for teaching one skilled in the art to employ the present invention.

The exemplary embodiments of this invention will be described in detail, with reference to the following Figures, wherein like reference numerals refer to like parts throughout the several views, and wherein.

DETAILED DESCRIPTION OF THE INVENTION

Figure 1:
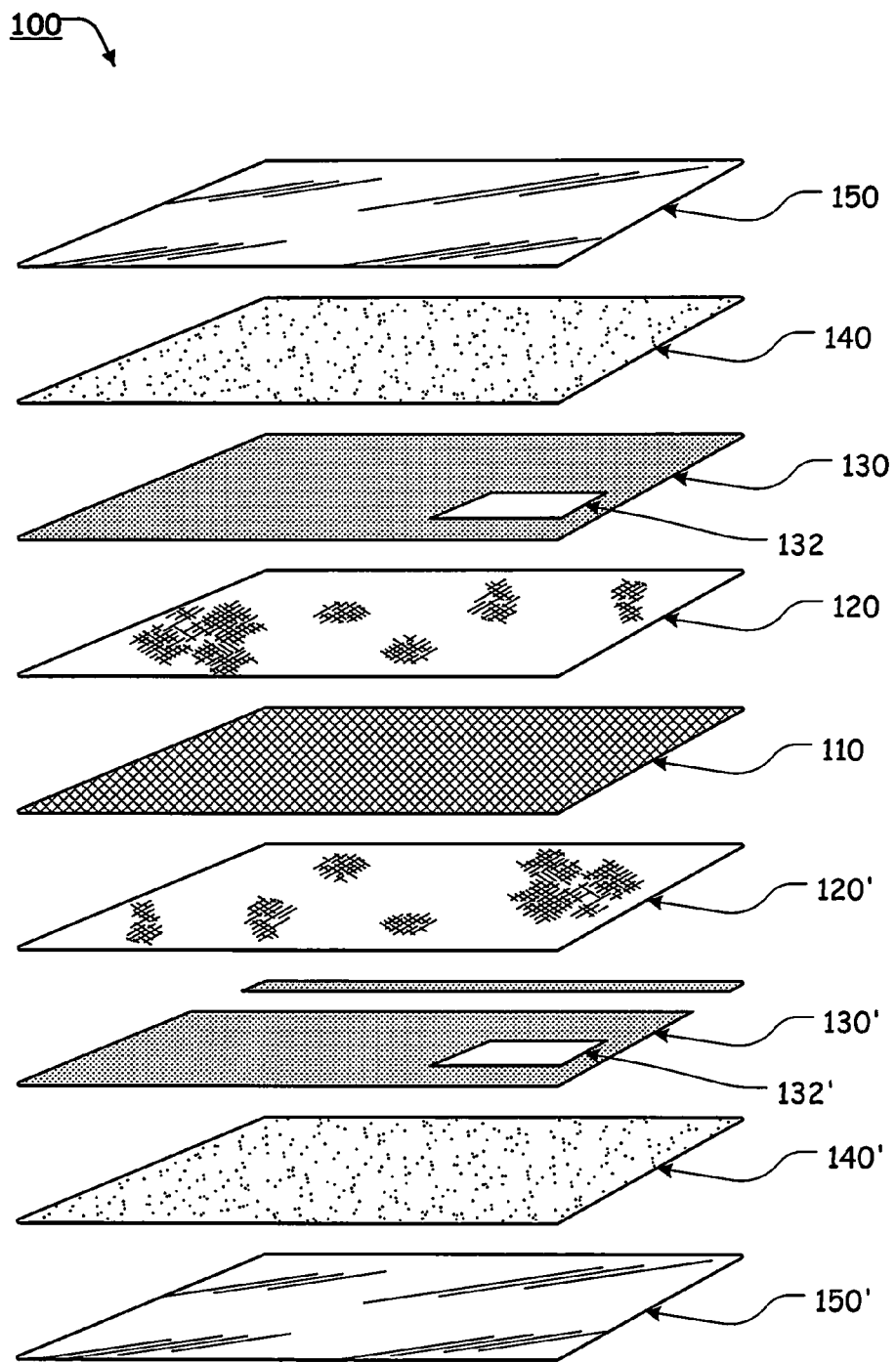
FIG. 1 shows a perspective view of a first exemplary embodiment of the structural elements of an information article incorporating the systems and methods of this invention.

For simplicity and clarification, the design factors and operating principles of the LaserLoc information article according to this invention are explained with reference to various exemplary embodiments of LaserLoc information article according to this invention. The basic explanation of the design factors and operating principles of the LaserLoc information article is applicable for the understanding, design, and operation of the LaserLoc information article of this invention. It should be appreciated that the LaserLoc information article can be adapted to many applications where it is desirous to have a LaserLoc information article with security features that are easy to visually identify, but difficult replicate.

Furthermore, it should be appreciated that, for simplicity and clarification, the embodiments of this invention will be described with reference to the features and elements of this invention being incorporated into an information article or a LaserLoc information article. However, it should be appreciated that the features and elements of this invention may be incorporated into any known or later developed card or article for which security or authentication features are desired.

It should also be appreciated that, as used herein, the terms "information article" and "LaserLoc" are used for basic explanation and understanding of the systems, methods, and articles of this invention. Therefore, the terms "information article" and "LaserLoc" are not to be construed as limiting the systems, methods, or articles of this invention. Thus, the terms "information article" and "LaserLoc" are to be understood to broadly include any article that may require authentication. For example, the terms "information article" and "LaserLoc" are to be understood to broadly include any birth certificates, security breeder documents, passports, stock certificates, titles of registration, labels for brand goods protection, social security cards, identification cards, membership cards, credit cards, debit cards, checks, currency, or any other article that involves visual validation of information that is unalterable or difficult to replicate.

Throughout this application the word "comprise", or variations such as "comprises" or "comprising" are used. It will be understood that these terms are meant to imply the inclusion of a stated element, integer, step, or group of elements, integers, or steps, but not the exclusion of any other element, integer, step, or group of elements, integers, or steps.

It should be understood that, for simplicity and clarification, the embodiments of this invention are described as incorporating or including one or more layers comprising polyester. However, it should be appreciated that polyester is only one exemplary material that may be used to construct the various layers of the information article of this invention. For example, one or more of the layers of the information article of this invention may comprise polyethylene (PE), High Density Polyethylene (HDPE), Low Density Polyethylene (LDPE), polypropylene (PP), polystyrene (PS), High impact polystyrene (HIPS), Acrylonitrile butadiene styrene (ABS), polyethylene terephthalate (PET or PETE), polyester (PES), polyamides (PA), other Nylons, polyvinyl chloride (PVC), polyurethane (PU), polycarbonate (PC), polyvinylidene chloride (PVDC), Bayblend (PC/ABS), polymethyl methacrylate (PMMA), Perspex, Oroglas, Plexiglas, polytetrafluoroethylene (PTFE), Teflon, polyetheretherketone (PEEK), polyketone, polyetherimide (PEI) (Ultem), phenolics (PF) or (phenol formaldehydes), Urea-formaldehyde (UF), Melamine formaldehyde (MF), polylactic acid, plastarch material, polyfluoroethylene, polyepoxide, epoxy, glass-reinforced plastic, carbon fiber-reinforced plastic, Dacron, terylene, lexan, Kevlar, Lucite, cellulose-based plastics such as celluloid or rayon, Bakelite or other phenolic plastics, phenol-formaldehyde, and/or other polymers acrylics, silicones, polyurethanes, thermoplastics, thermosets, elastomers, engineering plastics, synthetic rubber, natural rubber, or the like.

Turning now to FIG. 1, FIG. 1 shows a perspective view of a first exemplary embodiment of a LaserLoc information article 100 incorporating the systems and methods of this invention. As shown in FIG. 1, the LaserLoc information article 100 includes a plurality of layers.

Beginning at a central layer of the LaserLoc information article 100 of FIG. 1 and working outward, the LaserLoc information article 100 comprises a holographic film layer 110. The holographic film layer 110 is produced using known holographic image production methods.

It should be appreciated that, in various exemplary embodiments, the holographic film layer 110 may comprise a partial layer. If the holographic film layer 110 comprises a partial layer, it is preferable that the holographic portion appear in an area corresponding to one or more apertures formed in other of the layers of the LaserLoc information article 100.

In various exemplary embodiments, the holographic film layer 110 is approximately 0.002 inches thick. However, it should be appreciated that the thickness of the holographic film layer 110 is a design choice based on the desired appearance and/or functionality of the LaserLoc information article 100.

Clear polyester laminate layers 120 and 120' are formed or coupled to either side of the holographic film layer 110. In various exemplary embodiments, the clear polyester laminate layers 120 and 120' are adhesively bonded, molecularly bonded, thermally bonded, or pressure bonded to either side of the holographic film layer 110.

In various exemplary embodiments, the clear polyester laminate layers 120 and 120' are approximately 0.003 inches thick. However, it should be appreciated that the thickness of the clear polyester laminate layers 120 and 120' is a design choice based on the desired appearance and/or functionality of the LaserLoc information article 100.

High-opacity blocking layers 130 and 130' are formed or coupled to the clear polyester laminate layers 120 and 120', respectively. In various exemplary embodiments, the high-opacity blocking layers 130 and 130' are adhesively bonded, molecularly bonded, thermally bonded, or pressure bonded to the clear polyester laminate layers 120 and 120'.

In various exemplary embodiments, the high-opacity blocking layers 130 and 130' may be formed by applying a high-opacity, visible light, ultraviolet light, or other blocking material or substrate, such as, for example, a high-opacity ink, toner, or other appropriate blocking agent, atop the clear polyester laminate layers 120 and 120', respectively.

As shown in FIG. 1, the high-opacity blocking layers 130 and 130' each include a rectangular aperture 132 and 132', respectively, formed by an opening or void in the high-opacity blocking layer 130. The apertures 132 and 132' represent a complete or partial window in the LaserLoc information article 100. In areas where the aperture 132, formed in the high-opacity blocking layer 130, and the aperture 132', formed in the high-opacity blocking layer 130', are in registry with one another and/or include at least a portion that overlaps, a complete window is formed, such that the holographic film layer 110 will appear translucent from either side of the LaserLoc information article 100 when light is allowed to shine in the window. The degree of translucency may be determined based upon the thickness and/or composition of the holographic film layer 110.

Figure 7:
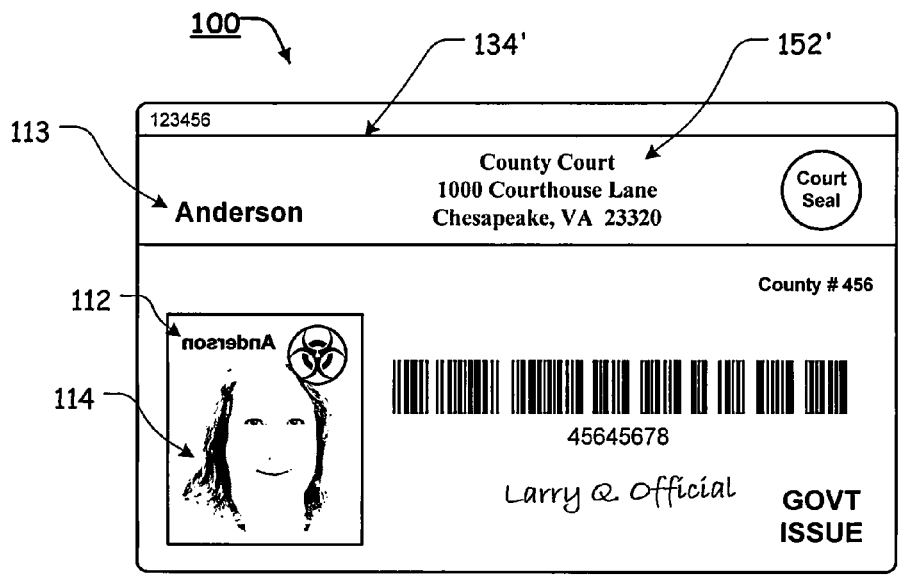
FIG. 7 shows a back view of a first exemplary embodiment of an information article of this invention, showing the LaserLoc information article, as viewed from the back, while under normal lighting conditions.

As further shown in FIG. 1, an aperture 134' is formed by an opening or void in the high-opacity blocking layer 130'. Because there is no counterpart aperture formed in the high-opacity blocking layer 130, the aperture 134' is a partial window and the holographic film layer 110 can only be viewed in the area of aperture 134' when the LaserLoc information article 100 is viewed from the back, as shown in FIG. 7.

It should be appreciated that the size, shape, and number of apertures 132, 132', and 134' formed in the high-opacity blocking layers 130 and 130' is a design choice based on the desired appearance and/or functionality of the LaserLoc information article 100. It should also be appreciated that the apertures formed in the high-opacity blocking layers 130 and 130' can take the form of a geometric shape, symbol, letter, number, phrase, or any other desired form.

In various exemplary embodiments, the high-opacity blocking layers 130 and 130' are approximately 0.00025 inches thick. However, it should be appreciated that the thickness of the high-opacity blocking layers 130 and 130' is a design choice based on the desired appearance and/or functionality of the LaserLoc information article 100.

Clear or substantially clear light excitable laminate layers 140 and 140' are formed or coupled to the high-opacity blocking layers 130 and 130', respectively. In various exemplary embodiments, the clear light excitable laminate layers 140 and 140' are adhesively bonded, molecularly bonded, thermally bonded, or pressure bonded to the high-opacity blocking layers 130 and 130'.

In various exemplary embodiments, the clear light excitable laminate layers 140 and 140' are approximately 0.009 inches thick. However, it should be appreciated that the thickness of the clear light excitable laminate layers 140 and 140' is a design choice based on the desired appearance and/or functionality of the LaserLoc information article 100.

Clear laminate layers 150 and 150' are formed or coupled to the clear light excitable laminate layers 140 and 140', respectively. In various exemplary embodiments, the clear laminate layers 150 and 150 are adhesively bonded, molecularly bonded, thermally bonded, or pressure bonded to the clear light excitable laminate layers 140 and 140'.

In various exemplary embodiments, the clear laminate layers 150 and 150' are approximately 0.002 inches thick. However, it should be appreciated that the thickness of the clear laminate layers 150 and 150' is a design choice based on the desired appearance and/or functionality of the LaserLoc information article 100.

Figure 2:
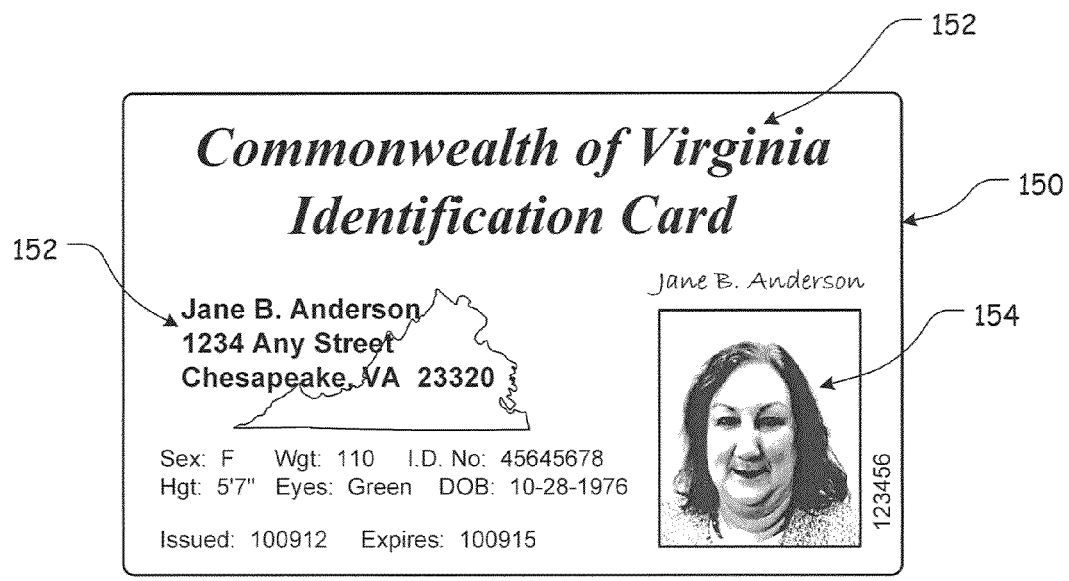
FIG. 2 shows a front view of a first exemplary embodiment of a front clear laminate layer of an information article of this invention, wherein informational indicia has been printed on an outer surface of the front clear laminate layer.

When the LaserLoc information article 100 has been formed by attaching, coupling, or otherwise joining the various layers, as described above, specific information can be incorporated into the LaserLoc information article 100 to create a unique LaserLoc information article 100. As shown in FIG. 2, informational indicia 152 can be populated on an outer surface of the clear laminate layer 150. It should be understood that FIG. 2 shows only exemplary informational indicia 152 populated on an outer surface of the clear laminate layer 150 and does not show other elements that may be visible in an assembled LaserLoc information article 100.

It should be appreciated that the informational indicia 152 populated on the outer surface of the clear laminate layer 150 may be any desired informational indicia that can be useful to create a unique LaserLoc information article 100. Likewise, the informational indicia 152 can be populated using, for example, dye sublimation, resin, pigment transfer, inkjet printing, toner based printing, offset lithography, gravure printing, intaglio printing, silkscreen printing, laser etching, laser printing, acid relief, and/or any other current or later developed technology capable of populating the informational indicia 152 on the outer surface of the clear laminate layer 150.

As illustrated in FIG. 2, informational indicia 152 may include identification information for a particular individual including, for example, name, address, brief description of physical characteristics, and the like. It should be appreciated that the included informational indicia 152 is a design choice based on the desired appearance and use of the LaserLoc information article 100.

A primary indicia 154, such as, for example, a color identifying photograph, is also populated on the outer surface of the clear laminate layer 150. The primary indicia 154 is placed in the area of the overlapping apertures 132 and 132', such that when the primary indicia 154 is viewed from the front of the LaserLoc information article 100 the primary indicia 154 takes on a holographic value from the holographic film layer 110.

Figure 3:
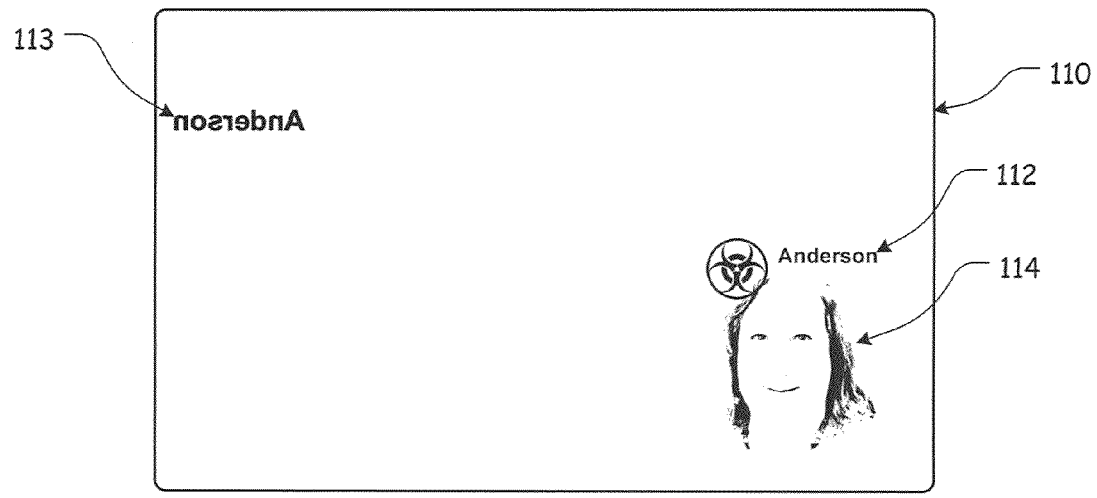
FIG. 3 shows a front view of a first exemplary embodiment of the holographic film layer of an information article of this invention, wherein material has been removed from the holographic film layer to create informational indicia in the holographic film layer.

FIG. 3, shows a front view of the holographic film layer 110 with certain informational indicia created in the holographic film layer 110. As shown in FIG. 3, certain informational indicia 112 and 113 and a complementary or representative indicia 114 is created in the holographic film layer 110 by the removal of material from the holographic film layer 110. In various exemplary embodiments, material is removed from the holographic film layer 110 by laser ablation.

As illustrated in FIG. 3, the informational indicia 112 comprises the seal of the LaserLoc information article issuing authority and the last name of the recipient of the identification card. The informational indicia 112 is included in the area of the overlapping apertures 132 and 132', such that light can be transmitted through the LaserLoc information article 100 in the ablated areas forming the informational indicia 112.

The informational indicia 113 comprises the last name of the recipient of the identification card, but is ablated into the holographic film layer 110 in reverse. Because the informational indicia 113 is located in an area of the aperture 134' (a partial window), the informational indicia 113 will only be clearly visible when viewed from the back of the LaserLoc information article 100 (the high-opacity blocking layer 130 will obscure the informational indicia 113 from these you from the front of the LaserLoc information article 100). If a powerful enough light source is used to illuminate the back of the LaserLoc information article 100, such that light is able to be visible through the high-opacity blocking layer 130, the informational indicia 113 may be viewed from the front of the LaserLoc information article 100.

The complementary or representative indicia 114 comprises an image generated from and corresponding to the primary indicia 154 or a graphical representation that relates to the primary indicia 154. For example, As shown in FIG. 3, the complementary or representative indicia 114 comprises selected tonal areas from the primary indicia 154. It should be appreciated that the complementary or representative indicia 114 can be created based on a selection of certain colors or tones (or groups of colors or tones) of the primary indicia 154. For example, the complementary or representative indicia 114 may be created from all or a select portion of the black (or K) areas of a cyan, magenta, yellow, and key (black) (CMYK) image. Alternatively, the complementary or representative indicia 114 may comprise a two or three dimensional barcode, QR code, or other graphical representation that corresponds or to the primary indicia 154. It should be appreciated that the method for selecting and creating the complementary or representative indicia 114 is a design choice based upon the desired intensity and light passage properties of the complementary or representative indicia 114.

In various exemplary embodiments, the complementary or representative indicia 114 is located so as to be in close, tight, or exact registration with the primary indicia 154. In this manner, when the LaserLoc information article 100 is viewed from the front, under normal lighting conditions, the complementary or representative indicia 114 does not interfere with the ability to view the primary indicia 154.

In other exemplary embodiments, the complementary or representative indicia 114 is located so as to be in proximate registration with the primary indicia 154. In these embodiments, the complementary or representative indicia 114 may be located anywhere on the LaserLoc information article 100.

Figure 4:
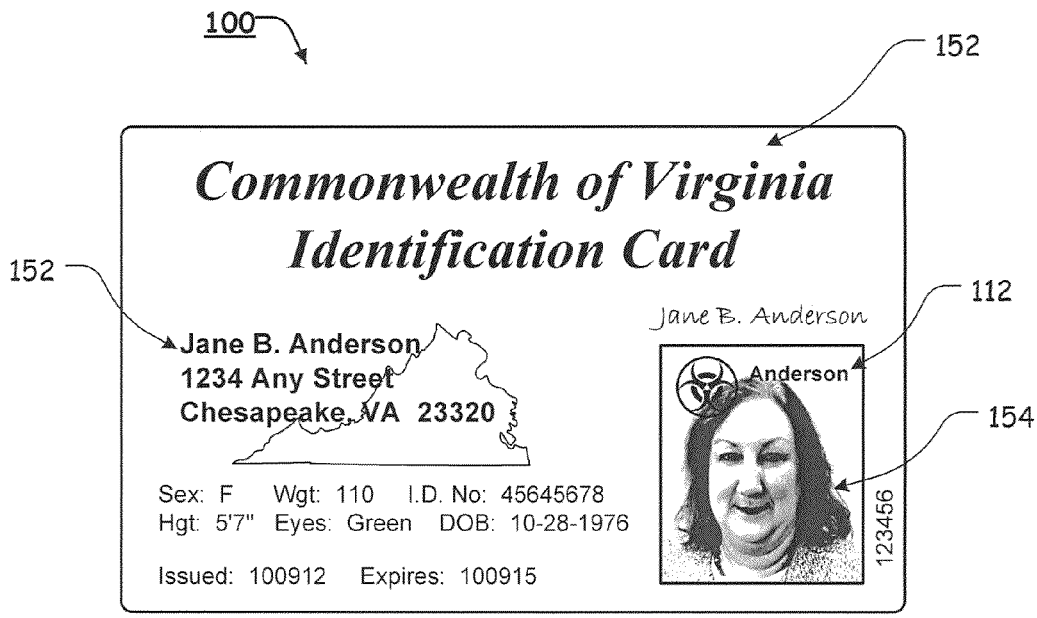
FIG. 4 shows a front view of a first exemplary embodiment of an information article of this invention, showing the LaserLoc information article, as viewed from the front, while under normal lighting conditions.

Thus, as illustrated in FIG. 4, when the LaserLoc information article 100 is viewed from the front under normal lighting conditions, the informational indicia 152, the primary indicia 154, and the informational indicia 112 are all visible. While present, the complementary or representative indicia 114 is not immediately noticeable or visible.

Figure 5:
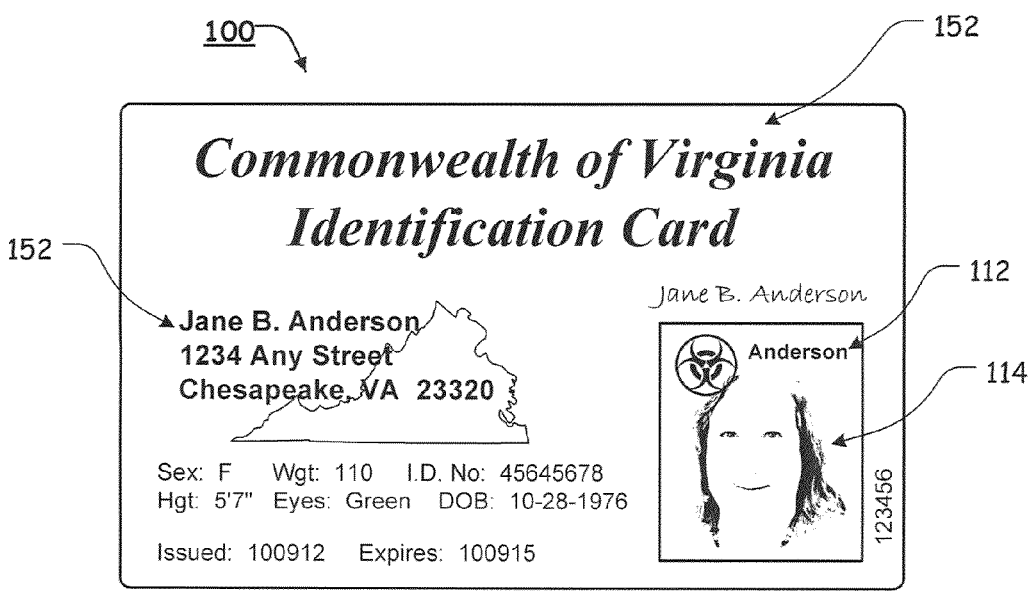
FIG. 5 shows a front view of a first exemplary embodiment of an information article of this invention, showing the LaserLoc information article, as viewed from the front, while back-lit.

When, as illustrated in FIG. 5, the LaserLoc information article 100 is viewed from the front under a backlit condition, the informational indicia 112 and the complementary or representative indicia 114 are clearly visible. Depending upon the intensity of the backlight, the informational indicia 113 may also be observable. It should be appreciated that, depending upon the method used to create the complementary or representative indicia 114, certain colors of the primary indicia 154 may also be visible through the ablated areas of the complementary or representative indicia 114.

Figure 6:
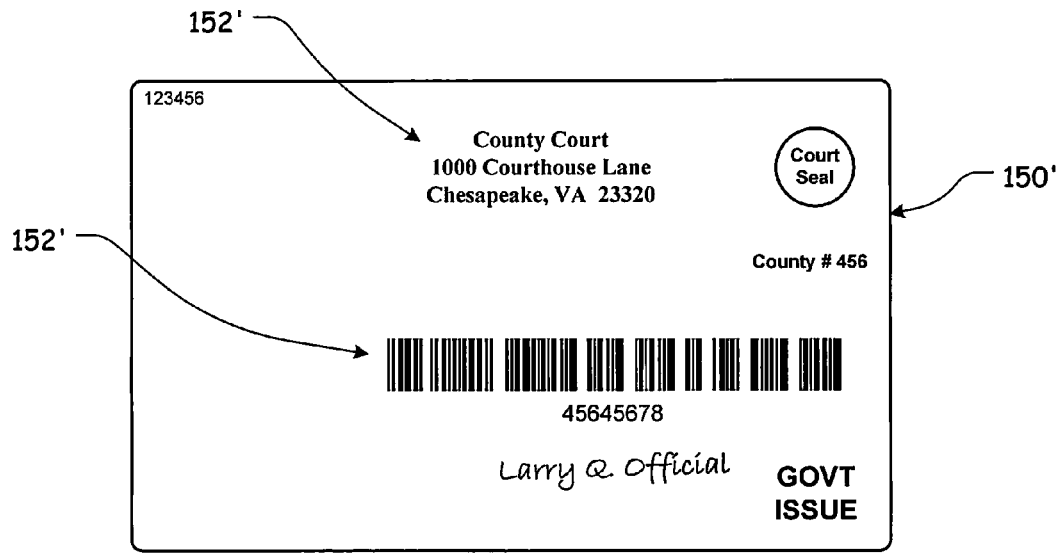
FIG. 6 shows a back view of a first exemplary embodiment of a back clear laminate layer of an information article of this invention, wherein informational indicia has been printed on an outer surface of the back clear laminate layer.

FIG. 6 shows a back view of the clear laminate layer 150', wherein informational indicia 152' has been printed on an outer surface of the clear laminate layer 150'. As shown in FIG. 6, informational indicia 152 can be populated on an outer surface of the clear laminate layer 150'. It should be understood that FIG. 6 shows only exemplary informational indicia 152' populated on an outer surface of the clear laminate layer 150' and does not show other elements that may be visible in an assembled LaserLoc information article 100.

FIG. 7 shows a back view of the LaserLoc information article 100, showing the LaserLoc information article 100, as viewed from the back, while under normal lighting conditions. Under normal lighting conditions, the informational indicia 112, the complementary or representative indicia 114, and the informational indicia 113 are viewable. Generally, the informational indicia 112 and the complementary or representative indicia 114 appear as black/gray images until the front side of the LaserLoc information article 100 is illuminated.

Because the informational indicia 113 is ablated into the holographic film layer 110 in reverse, the informational indicia 113 is readable when viewed from the back of the LaserLoc information article 100.

If the LaserLoc information article 100 is viewed from the back and illuminated from the front, the informational indicia 112 and the complementary or representative indicia 114 allow light to pass through the LaserLoc information article 100 and the informational indicia 113 becomes more clearly visible.

Figure 8:
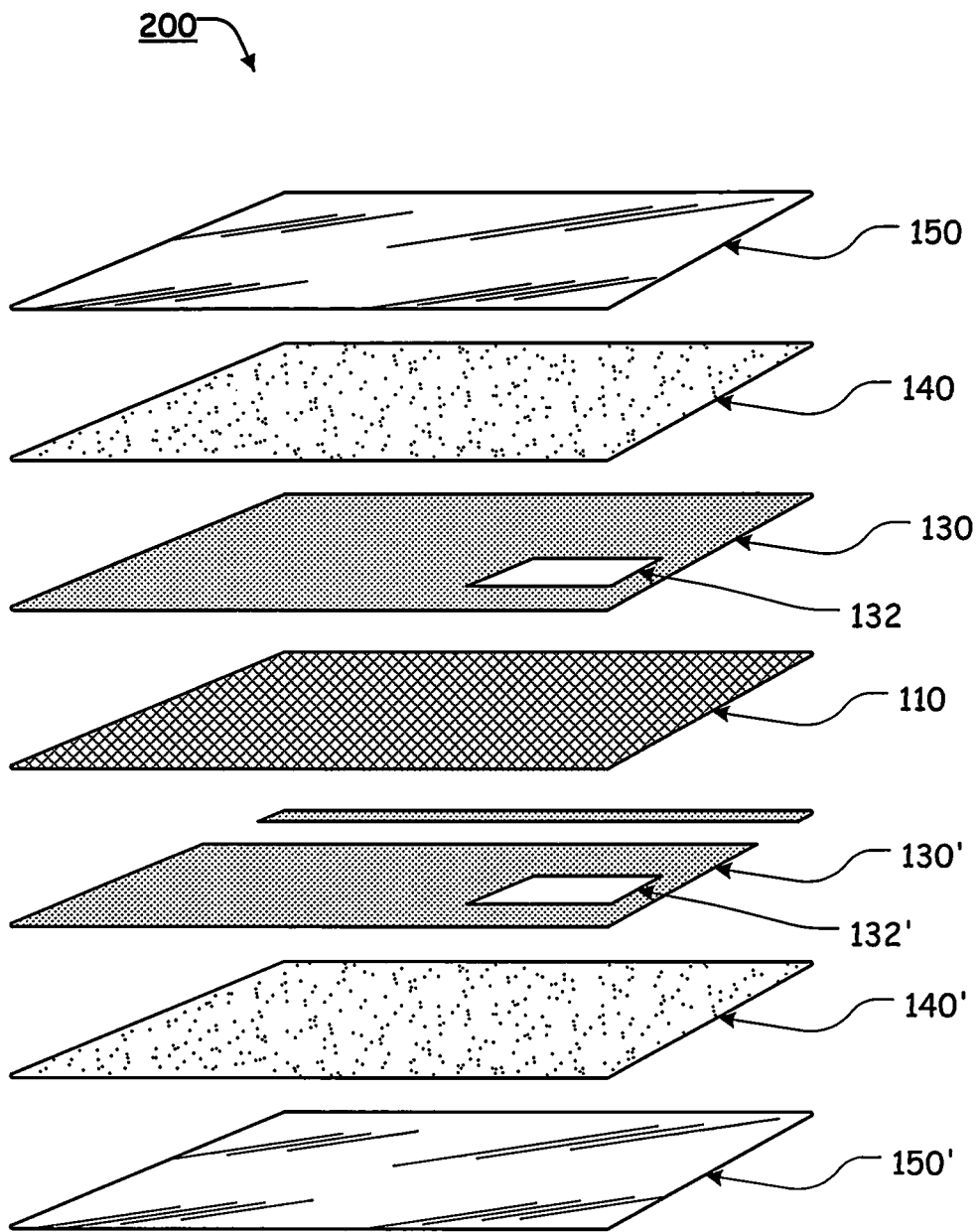
FIG. 8 shows a perspective view of a second exemplary embodiment of the structural elements of an information article incorporating the systems and methods of this invention.

FIG. 8 shows a perspective view of a second exemplary embodiment of the structural elements of an information article 200 incorporating the systems and methods of this invention. As shown in FIG. 8, the LaserLoc information article 200 is constructed similarly to the LaserLoc information article 100. However, the clear polyester laminate layers 120 and 120' are not present in the LaserLoc information article 200.

Figure 9:
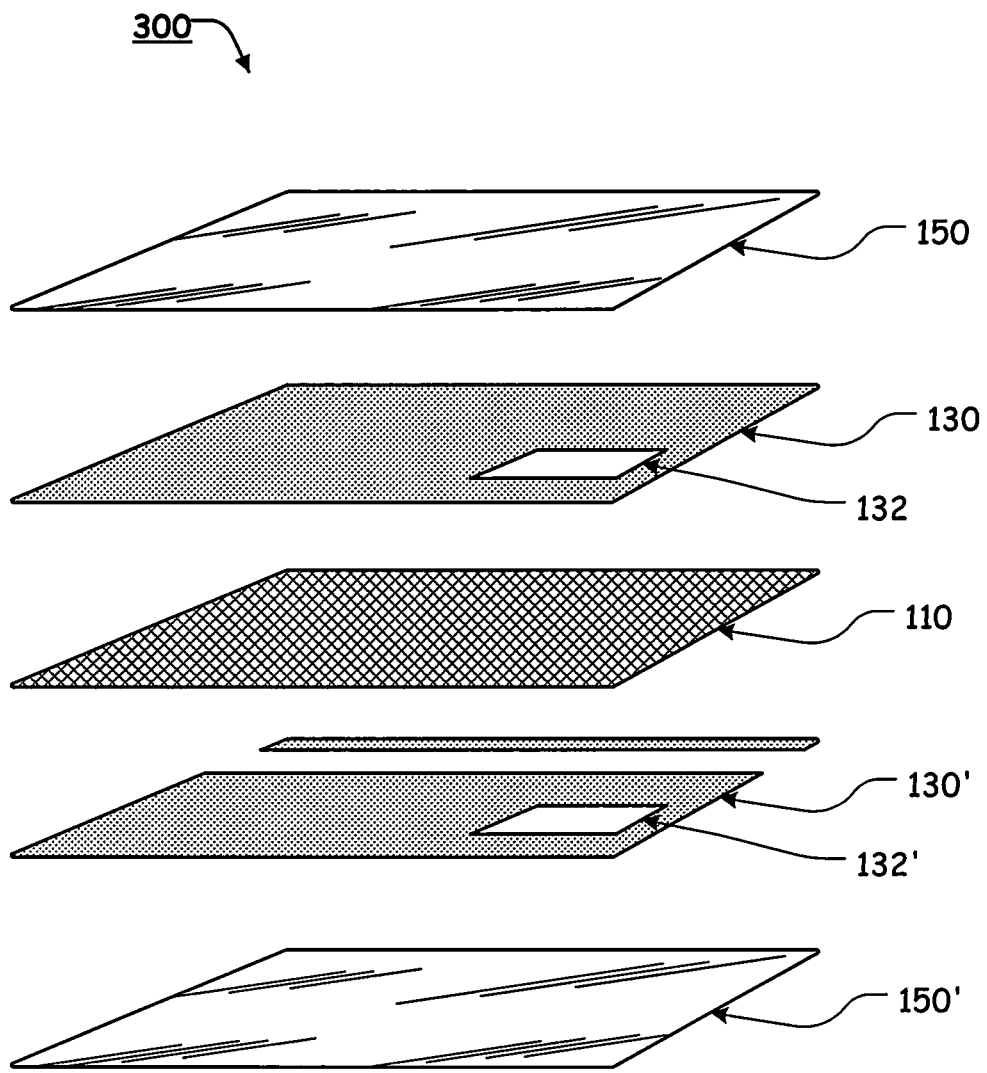
FIG. 9 shows a perspective view of a third exemplary embodiment of the structural elements of an information article incorporating the systems and methods of this invention.

FIG. 9 shows a perspective view of a third exemplary embodiment of the structural elements of an information article 300 incorporating the systems and methods of this invention. As shown in FIG. 9, the LaserLoc information article 300 is constructed similarly to the LaserLoc information article 100. However, the clear polyester laminate layers 120 and 120' and the clear light excitable laminate layers 140 and 140' are not present in the LaserLoc information article 300.

Figure 10:
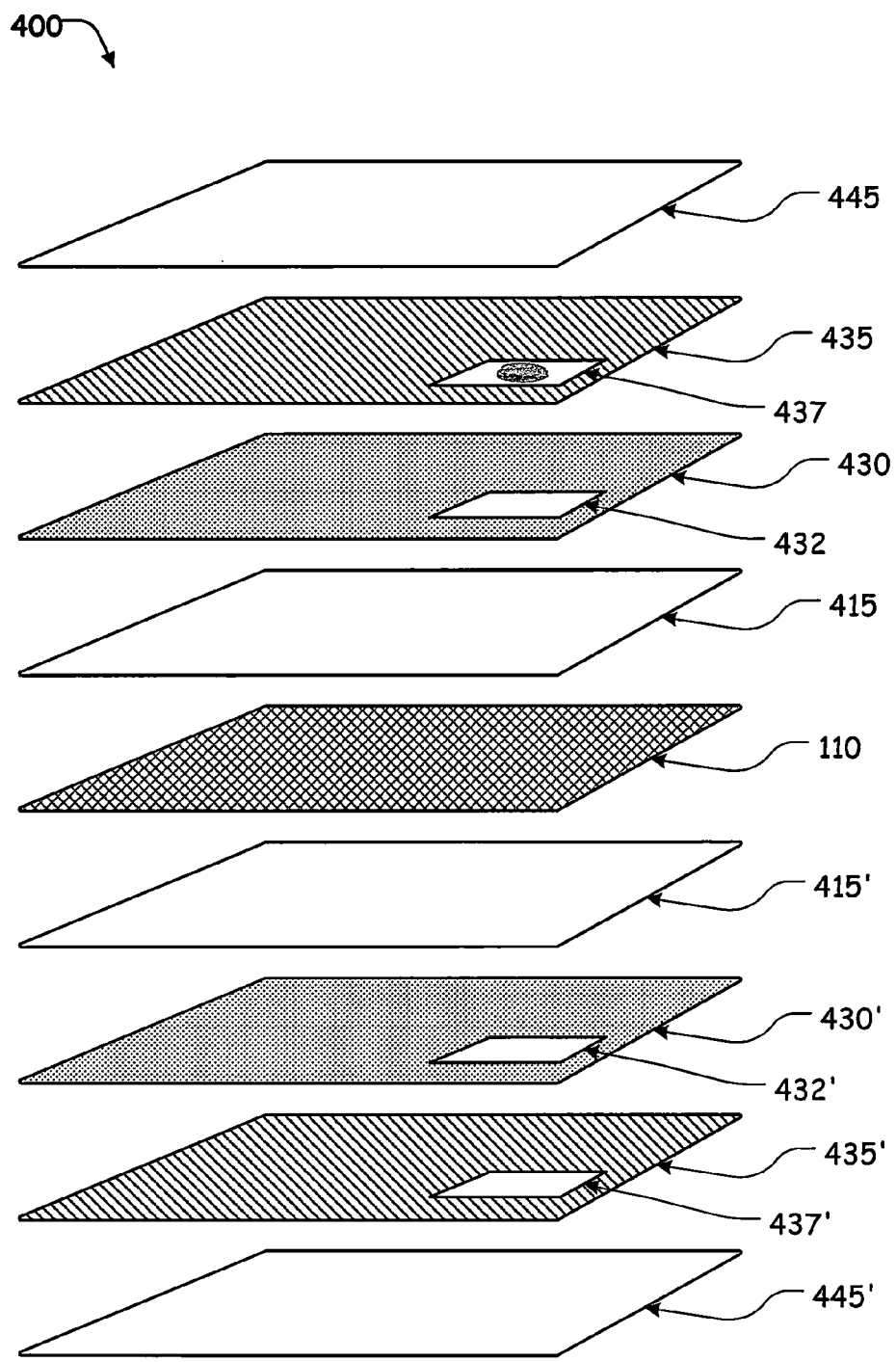
FIG. 10 shows a perspective view of a fourth exemplary embodiment of an information article incorporating the systems and methods of this invention.

FIG. 10 shows a perspective view of a second exemplary, nonlimiting embodiment of an information article 400 incorporating the systems and methods of this invention. As shown in FIG. 10, the exemplary information article 400 is a multi-layer birth certificate.

Beginning at a central layer of the information article 400 of FIG. 10 and working outward, the information article 400 incorporates the holographic film layer 110. The holographic film layer 110 is as described above with respect to FIGS. 1-7 and includes at least a complementary or representative indicia 114.

Ink receptive coating layers 415 and 415' are formed or coupled on either side of the holographic film layer 110. In various exemplary embodiments, the ink receptive coating layers 415 and 415' comprise a coating that is capable accepting and retaining an ink.

High-opacity blocking layers 430 and 430' are formed or coupled to the ink receptive coating layers 415 and 415', respectively. In various exemplary embodiments, the high-opacity blocking layers 430 and 430' may be formed by applying a high-opacity blocking material or substrate, such as, for example, a high-opacity ink, toner, or other appropriate blocking agent, atop the ink receptive coating layers 415 and 415', respectively.

As shown in FIG. 10, the high-opacity blocking layers 430 and 430' each include a rectangular aperture 432 and 432', respectively, formed by an opening or void in the high-opacity blocking layer 430. The apertures 432 and 432' represent a window in the information article 400. In areas where the aperture 432, formed in the high-opacity blocking layer 430, and the aperture 432', formed in the high-opacity blocking layer 430' overlap, the holographic film layer 110 will appear translucent when light is allowed to shine in the window. The degree of translucency may be determined based upon the thickness and/or composition of the holographic film layer 110.

It should be appreciated that the size, shape, and number of apertures 432 and 432' formed in the high-opacity blocking layers 430 and 430' is a design choice based on the desired appearance and/or functionality of the information article 400.

The thickness of the high-opacity blocking layers 430 and 430' is a design choice based on the desired appearance and/or functionality of the information article 400.

A layer of security printing inks 435 and 435' is formed or coupled to the high-opacity blocking layers 430 and 430', respectively. In various exemplary, nonlimiting embodiments, the layer of security printing inks 435 and 435' comprise multi-color security printing inks.

The thickness of the layer of security printing ink(s) 435 and 435' is a design choice based on the desired appearance and/or functionality of the information article 400.

As shown in FIG. 10, a fingerprint is included in one of the layers of security printing ink(s) 435 and 435'. It should be appreciated that any informational indicia, such as, for example, an image, identifier, photograph, mark, or the like could be included in place of the fingerprint. Because a fingerprint is included in an area of an aperture 437 and 437', formed in the layers of security printing ink(s) 435 and 435', respectively, and because the apertures 437 and 437' correspond to apertures 432 and 432', the fingerprint will appear superimposed over the translucent portion of the holographic film layer 110 that is visible in the window in the information article 400. The degree of translucency may be determined based upon the thickness and/or composition of the holographic film layer 110.

Image receptive coating layers 445 and 445' are formed or coupled to the layer of security printing ink(s) 435 and 435', respectively. The thickness of the image receptive coating layers 445 and 445' is a design choice based on the desired appearance and/or functionality of the information article 400.

A primary indicia 447 (not shown), such as, for example, a color identifying photograph, is also populated on the outer surface of the image receptive coating layer 445. The primary indicia 447 (not shown) corresponds to and operates similarly to the primary indicia 154. The primary indicia 447 (not shown) is aligned so as to function in conjunction with the complementary or representative indicia 114, as described above with respect to FIGS. 1-7.

Figure 11:
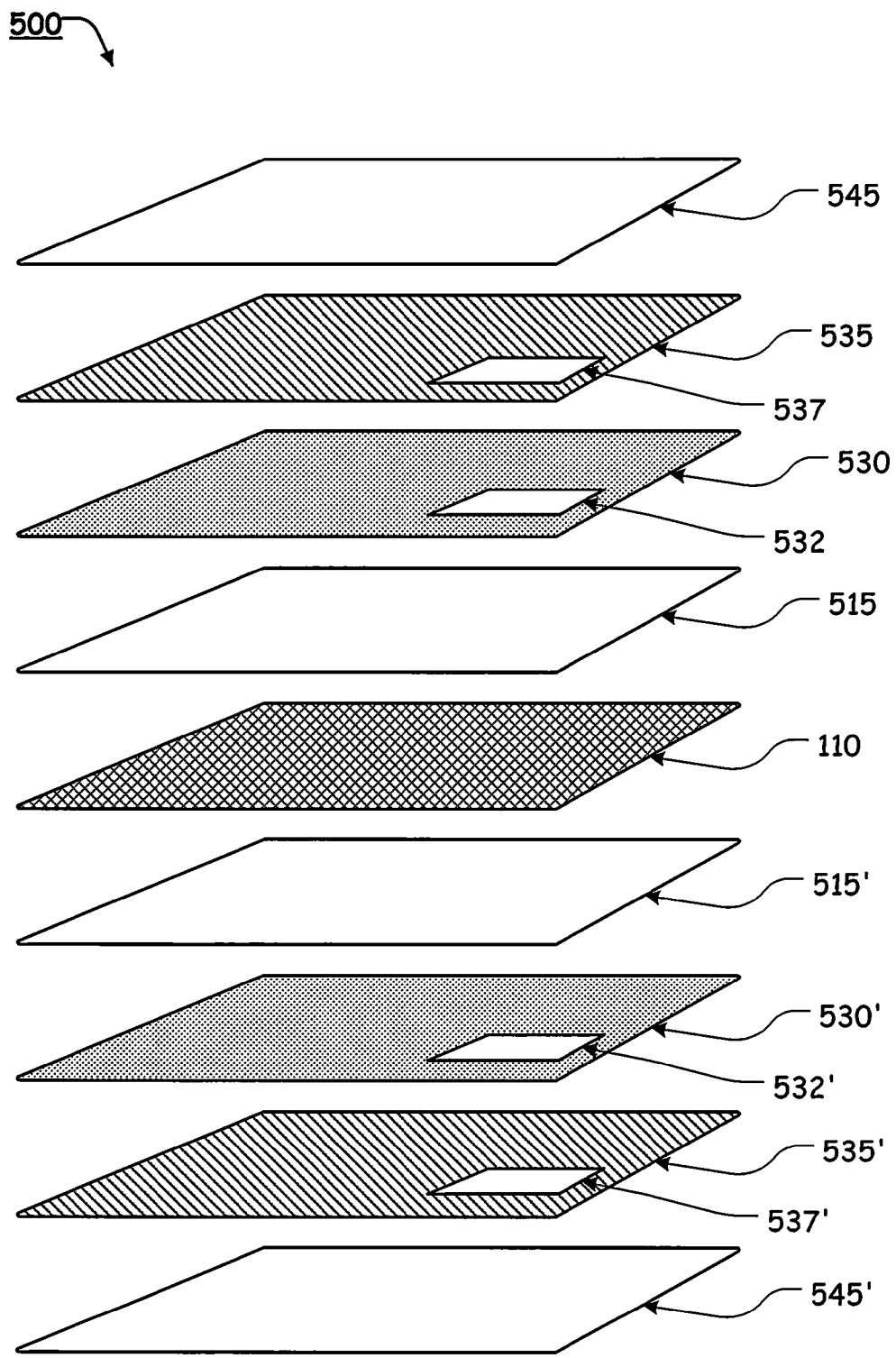
FIG. 11 shows a perspective view of a fifth exemplary embodiment of an information article incorporating the systems and methods of this invention.

FIG. 11 shows a perspective view of a fifth exemplary embodiment of an information article 500 incorporating the systems and methods of this invention. As shown in FIG. 11, the information article 500 is a multi-layer currency.

Beginning at a central layer of the information article 500 of FIG. 11 and working outward, the information article 500 incorporates the holographic film layer 110. The holographic film layer 110 is as described above with respect to FIGS. 1-7 and includes at least a complementary or representative indicia 114.

Ink receptive coating layers 515 and 515' are formed or coupled on either side of the holographic film layer 110. In various exemplary embodiments, the ink receptive coating layers 515 and 515' comprise a coating is capable accepting and retaining an ink.

High-opacity blocking layers 530 and 530' are formed or coupled to the ink receptive coating layers 515 and 515', respectively. In various exemplary embodiments, the high-opacity blocking layers 530 and 530' may be formed by applying a high-opacity blocking material or substrate, such as, for example, a high-opacity ink, toner, or other appropriate blocking agent, atop the ink receptive coating layers 515 and 515', respectively.

As shown in FIG. 11, the high-opacity blocking layers 530 and 530' each include an oval-shaped aperture 532 and 532', respectively, formed by an opening or void in the high-opacity blocking layer 530. The apertures 532 and 532' represent a window in the information article 500. In areas where the aperture 532, formed in the high-opacity blocking layer 530, and the aperture 532', formed in the high-opacity blocking layer 530', overlap, the holographic film layer 110 will appear translucent when light is allowed to shine in the window. The degree of translucency may be determined based upon the thickness and/or composition of the holographic film layer 110.

It should be appreciated that the size, shape, and number of apertures 532 and 532' formed in the high-opacity blocking layers 530 and 530' is a design choice based on the desired appearance and/or functionality of the information article 500.

The thickness of the high-opacity blocking layers 530 and 530' is a design choice based on the desired appearance and/or functionality of the information article 500.

A layer of security printing inks 535 and 535' is formed or coupled to the high-opacity blocking layers 530 and 530', respectively. In various exemplary, nonlimiting embodiments, the layer of security printing inks 535 and 535' comprise multi-color security printing inks.

The thickness of the layer of security printing ink(s) 535 and 535' is a design choice based on the desired appearance and/or functionality of the information article 500.

As shown in FIG. 11, a fingerprint is included in one of the layers of security printing ink(s) 535 and 535'. It should be appreciated that any informational indicia, such as, for example, an image, identifier, photograph, mark, or the like could be included in place of the fingerprint. Because apertures 537 and 537', formed in the layers of security printing ink(s) 535 and 535', respectively, correspond to the apertures 532 and 532', the translucent portion of the holographic film layer 110 will be visible in the window in the information article 500. The degree of translucency may be determined based upon the thickness and/or composition of the holographic film layer 110.

Image receptive coating layers 545 and 545' are formed or coupled to the layer of security printing ink(s) 535 and 535', respectively. The thickness of the image receptive coating layers 545 and 545' is a design choice based on the desired appearance and/or functionality of the information article 500.

A primary indicia 547 (not shown), such as, for example, a color identifying photograph, is also populated on the outer surface of the image receptive coating layer 545. The primary indicia 547 (not shown) corresponds to and operates similarly to the primary indicia 154. The primary indicia 547 (not shown) is aligned so as to function in conjunction with the complementary or representative indicia 114, as described above with respect to FIGS. 1-7.

While this invention has been described in conjunction with the exemplary embodiments outlined above, the foregoing description of exemplary embodiments of the invention, as set forth above, are intended to be illustrative, not limiting and the fundamental invention should not be considered to be necessarily so constrained. It is evident that the invention is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the invention. The upper and lower limits of these smaller ranges may independently be included in the smaller ranges and is also encompassed within the invention, subject to any specifically excluded limit in the stated range. Where the stated range includes one or both of the limits, ranges excluding either or both of those included limits are also included in the invention.

It is to be understood that the phraseology of terminology employed herein is for the purpose of description and not of limitation. Unless defined otherwise, all technical and scientific terms used herein have the same meaning as commonly understood by one of ordinary skill in the art to which this invention belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the invention, such that others may, by applying current knowledge, change, vary, modify, and/or adapt these exemplary, non-limiting embodiments for various applications without departing from the spirit and scope of the invention and elements or methods similar or equivalent to those described herein can be used in practicing the present invention. Any and all such changes, variations, modifications, and/or adaptations should and are intended to be comprehended within the meaning and range of equivalents of the disclosed exemplary embodiments and may be substituted without departing from the true spirit and scope of the invention.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. An information article comprising:
   a holographic film layer having a top side and a bottom side, wherein said holographic film layer includes at least some complementary or representative indicia formed in said holographic film layer;
   a first substantially clear polyester laminate layer having a top side and a bottom side, wherein said bottom side of said first substantially clear polyester laminate layer is coupled to said top side of said holographic film layer;
   a second substantially clear polyester laminate layer having a top side and a bottom side, wherein said top side of said second substantially clear polyester laminate layer is coupled to said bottom side of said holographic film layer;
   a first high-opacity blocking layer having a top side and a bottom side, wherein said bottom side of said first high-opacity blocking layer is coupled to said top side of said first substantially clear polyester laminate layer, wherein said first high-opacity blocking layer comprises at least one aperture, wherein said at least one aperture is formed by a void in said first high-opacity blocking layer;
   a second high-opacity blocking layer having a top side and a bottom side, wherein said top side of said second high-opacity blocking layer is coupled to said bottom side of said second substantially clear polyester laminate layer, wherein said second high-opacity blocking layer comprises at least one aperture, wherein said at least one aperture is formed by a void in said second high-opacity blocking layer, such that in areas where said aperture formed in said first high-opacity blocking layer and said aperture formed in said second high-opacity blocking layer overlap, said holographic film layer appears translucent when light is allowed to shine in an area of overlap;
   a first substantially clear light excitable laminate layer having a top side and a bottom side, wherein said bottom side of said first substantially clear light excitable laminate layer is coupled to said top side of said first high-opacity blocking layer;
   a second substantially clear light excitable laminate layer having a top side and a bottom side, wherein said top side of said second substantially clear light excitable laminate layer is coupled to said bottom side of said second high-opacity blocking layer;
   a first substantially clear laminate layer having a top side and a bottom side, wherein said bottom side of said first substantially clear laminate layer is coupled to said top side of said first substantially clear light excitable laminate layer, wherein a primary indicia is populated on said top side of said clear laminate layer, wherein said primary indicia corresponds to or is represented by said complementary or representative indicia, and wherein said primary indicia is in at least proximate registration with said complementary or representative indicia; and
   a second substantially clear laminate layer having a top side and a bottom side, wherein said top side of said second substantially clear laminate layer is coupled to said bottom side of said second substantially clear light excitable laminate layer.

2. The information article of claim 1, wherein said first substantially clear polyester laminate layer and said second substantially clear polyester laminate layer are each adhesively coupled to said holographic film layer.

3. The information article of claim 1, wherein said first high-opacity blocking layer is adhesively coupled to said first substantially clear polyester laminate layer and said second high-opacity blocking layer is adhesively coupled to said second substantially clear polyester laminate layer.

4. The information article of claim 1, wherein said first substantially clear light excitable laminate layer is adhesively coupled to said first high-opacity blocking layer and said second substantially clear light excitable laminate layer is adhesively coupled to said second high-opacity blocking layer.

5. The information article of claim 1, wherein said first substantially clear laminate layer is adhesively coupled to said first substantially clear light excitable laminate layer and said second substantially clear laminate layer is adhesively coupled to said second substantially clear light excitable laminate layer.

6. The information article of claim 1, wherein an informational indicia is included in an area of an aperture formed in at least one of said first high-opacity blocking layer or said second high-opacity blocking layer.

7. The information article of claim 1, wherein said holographic film layer comprises polyester.

8. The information article of claim 1, wherein said high-opacity blocking layers comprise a high-opacity blocking material or substrate.

9. The information article of claim 1, wherein said high-opacity blocking layers comprise a high-opacity ink.

10. The information article of claim 1, wherein said high-opacity blocking layers comprise a high-opacity toner.

11. The information article of claim 1, wherein a degree of translucency of said holographic film layer is determined based upon said thickness of said holographic film layer.

12. The information article of claim 1, wherein a degree of translucency of said holographic film layer is determined based upon said composition of said holographic film layer.

13. The information article of claim 1, wherein said complementary or representative indicia is defined by removed material from said holographic film layer.

14. The information article of claim 1, wherein said primary indicia is formed so as to be at least partially be contained within said at least one aperture of said first high-opacity blocking layer and said at least one aperture of said second high-opacity blocking layer.

15. The information article of claim 1, wherein said primary indicia is a color photograph.

16. The information article of claim 1, wherein said primary indicia is a cyan, magenta, and yellow (CMY) component of a cyan, magenta, yellow, and key or black (CMYK) image and said complementary or representative indicia is a black component of a CMYK image.

17. The information article of claim 1, wherein said complementary or representative indicia is in close, tight, or exact registration with said primary indicia.

18. The information article of claim 1, wherein said primary indicia is populated on said top side of said clear laminate layer using dye sublimation, resin, pigment transfer, inkjet printing, toner based printing, offset lithography, gravure printing, intaglio printing, silkscreen printing, laser etching, laser printing, acid relief, an ultraviolet (UV) ink, infrared (IR) ink, magnetic ink, UV invisible long wave ink, UV invisible short wave ink, dual band ink, laser invisible ink, color shifting ink, thermochromatic ink, photochromatic ink, chemical reactive ink, or metallic ink.

19. An information article comprising:
a holographic film layer having a top side and a bottom side, wherein said holographic film layer includes at least some complementary or representative indicia formed in said holographic film layer;
a first high-opacity blocking layer having a top side and a bottom side, wherein said bottom side of said first high-opacity blocking layer is coupled to
said top side of said first substantially clear polyester laminate layer, wherein said first high-opacity blocking layer comprises at least one aperture, wherein said at least one aperture is formed by a void in said first high-opacity blocking layer;
a second high-opacity blocking layer having a top side and a bottom side, wherein said top side of said second high-opacity blocking layer is coupled to said bottom side of said second substantially clear polyester laminate layer, wherein said second high-opacity blocking layer comprises at least one aperture, wherein said at least one aperture is formed by a void in said second high-opacity blocking layer, such that in areas where said aperture formed in said first high-opacity blocking layer and said aperture formed in said second high-opacity blocking layer overlap, said holographic film layer appears translucent when light is allowed to shine in an area of overlap;
a first substantially clear light excitable laminate layer having a top side and a bottom side, wherein said bottom side of said first substantially clear light excitable laminate layer is coupled to said top side of said first high-opacity blocking layer;
a second substantially clear light excitable laminate layer having a top side and a bottom side, wherein said top side of said second substantially clear light excitable laminate layer is coupled to said bottom side of said second high-opacity blocking layer;
a first substantially clear laminate layer having a top side and a bottom side, wherein said bottom side of said first substantially clear laminate layer is coupled to said top side of said first substantially clear light excitable laminate layer, wherein a primary indicia is populated on said top side of said clear laminate layer, wherein said primary indicia corresponds to or is represented by said complementary or representative indicia, and wherein said primary indicia is in at least proximate registration with said complementary or representative indicia; and
a second substantially clear laminate layer having a top side and a bottom side, wherein said top side of said second substantially clear laminate layer is coupled to said bottom side of said second substantially clear light excitable laminate layer.

20. An information article comprising:
a holographic film layer having a top side and a bottom side, wherein said holographic film layer includes at least some complementary or representative indicia formed in said holographic film layer;
a first high-opacity blocking layer having a top side and a bottom side, wherein said bottom side of said first high-opacity blocking layer is coupled to said top side of said first substantially clear polyester laminate layer, wherein said first high-opacity blocking layer comprises at least one aperture, wherein said at least one aperture is formed by a void in said first high-opacity blocking layer;
a second high-opacity blocking layer having a top side and a bottom side, wherein said top side of said second high-opacity blocking layer is coupled to said bottom side of said second substantially clear polyester laminate layer, wherein said second high-opacity blocking layer comprises at least one aperture, wherein said at least one aperture is formed by a void in said second high-opacity blocking layer, such that in areas where said aperture formed in said first high-opacity blocking layer and said aperture formed in said second high-opacity blocking layer overlap, said holographic film layer appears translucent when light is allowed to shine in an area of overlap;
a first substantially clear laminate layer having a top side and a bottom side, wherein said bottom side of said first substantially clear laminate layer is coupled to a top side of a first substantially clear light excitable laminate layer, wherein a primary indicia is populated on said top side of said clear laminate layer, wherein said primary indicia corresponds to or is represented by said complementary or representative indicia, and wherein said primary indicia is in at least proximate registration with said complementary or representative indicia; and
a second substantially clear laminate layer having a top side and a bottom side, wherein said top side of said second substantially clear laminate layer is coupled to a bottom side of a second substantially clear light excitable laminate layer.

* * * * *